(United States Patent [19])

Miki et al.

[11] 4,087,484
[45] May 2, 1978

[54] PROCESS FOR PRODUCING TRANSPARENT BLOCK COPOLYMER RESIN

[75] Inventors: Tamotsu Miki; Akio Imai; Yuji Kobayashi, all of Ichihara, Japan

[73] Assignee: Sumitomo Chemical Company, Limited, Osaka, Japan

[21] Appl. No.: 649,729

[22] Filed: Jan. 16, 1976

Related U.S. Application Data

[63] Continuation of Ser. No. 531,072, Dec. 9, 1974, abandoned.

[30] Foreign Application Priority Data

Dec. 13, 1973 Japan .................................. 48-140150
Feb. 22, 1974 Japan .................................. 49-21737

[51] Int. Cl.$^2$ ........................................... C08F 297/04
[52] U.S. Cl. ........................... 260/880 B; 260/29.7 E; 260/29.7 N
[58] Field of Search ...... 260/880 B, 29.7 E, 29.7 NR, 260/29.7 N, 29.7 EM

[56] References Cited

U.S. PATENT DOCUMENTS

| | | | |
|---|---|---|---|
| 2,965,678 | 12/1960 | Sundberg | 260/29.7 E |
| 3,726,824 | 4/1973 | Saunders | 260/880 B |
| 3,923,707 | 12/1975 | Berg | 260/880 B |

OTHER PUBLICATIONS

Sisley & Wood, "Encyclopdia of Surface-Active Agents", Chemical Pub. Co., 1964, p. 406.
Schwartz & Perry, "Surface Active Agents and Detergents Vol. II", Interscience Pub. Inc., New York, 1958, pp. 163-166.

Primary Examiner—Paul R. Michl
Attorney, Agent, or Firm—Stevens, Davis, Miller & Mosher

[57] ABSTRACT

An aromatic vinyl compound and a conjugated diene are block-copolymerized in a hydrocarbon solvent using an organolithium compound as an initiator to form a hydrocarbon solution of a block copolymer resin which is then steam-stripped off the solvent in the presence of a specified block polyether type dispersing agent to yield a granular polymer. The block copolymer thus obtained has favorable properties as granules and can be fabricated into articles being highly transparent and having excellent mechanical properties.

9 Claims, No Drawings

PROCESS FOR PRODUCING TRANSPARENT BLOCK COPOLYMER RESIN

This is a continuation of application Ser. No. 531,072, filed Dec. 9, 1974, now abandoned.

This invention relates to a method of after-treatment in producing a block copolymer resin, which is transparent and excellent in mechanical properties, starting from a styrene-type monomer and a conjugated diene. More particularly, this invention relates to a method for recovering a block copolymer in the presence of a dispersing agent from its solution obtained by block-copolymerizing a styrene-type monomer and a conjugated diene in a hydrocarbon solvent using an organolithium compound as an initiator.

Several methods have heretofore been proposed for copolymerizing a styrene-type monomer and a conjugated diene in the presence of an anionic polymerization initiator.

It has also been known that a transparent resin having excellent mechanical properties, particularly elongation and impact strength, is obtained in some particular cases when the styrene-type monomeric unit content of the copolymer is relatively high. In these polymerization procedures, it is common to use an inert hydrocarbon as a solvent from the viewpoint of the operation and because the solvent should be inert to the anionic polymerization initiator. When an aromatic or a naphthenic hydrocarbon is used as a solvent, polymerization proceeds very smoothly, and the produced polymer is dissolved uniformly in the solvent, but a fairly complicated procedure is required in order to recover a solid resin from the polymer solution thus obtained, so there is a great difficulty to carry out such a procedure steadily and economically on a commercial scale. The methods for recovering a polymer from its solution, which have hitherto been known to the art, include (1) a method in which a large excess of a non-solvent for the polymer is mixed with the polymer solution to precipitate the latter,
(2) a method in which a polymer solution is either introduced into hot water or mixed with steam to remove the solvent by steam-stripping, and
(3) a method in which a polymer solution is directly heated to remove the solvent by evaporation and to dry the polymer.

Of these methods, a method such as (1) which utilizes a large amount of a nonsolvent to precipitate the polymer needs a lot of expensive procedure such as the recovery of a large amount of the nonsolvent used, but also accompanied by a great difficulty to form a uniform and granular polymer, because of the tendency of the precipitated polymer to agglomerate to large blocks. Another method such as (3), in which a polymer solution is directly heated to dryness, also has a great difficulty in treating polymer solutions of high viscosity, especially in treating on a large scale a massive polymer generally obtained by this method. For the reasons mentioned above, there is adopted in most of the cases a method such as (2), in which a polymer solution is introduced into hot water or mixed with steam to remove the solvent by steam-stripping. In this case, however, it has been known that if the polymer solution is simply poured into hot water with stirring, the polymer sticks concretely to tank walls and stirrer blades or precipitates in the form of large blocks, so it is very difficult to recover and treat the polymer in an industrial matter. To avoid such a difficulty, various methods have been proposed, mostly in recovery of rubbery polymers. For example, a method in which the polymer solution is admixed with a nonmiscible solvent and then sprayed through a nozzle (Japanese Patent Publication No. 39,548/70) and several methods which make use of dispersing agents such as (1) a combination use of a compound selected from (a) zinc oxide, (b) lignin-sulfonates, and (c) water-soluble polymeric materials having multiple carboxyl groups with a metal ion, such as an ion of calcium, strontium, barium, aluminum, iron, cobalt, and nickel (Japanese Patent Publication No. 17,497/62), (2) the combined use of an anionic surface active agent and a cationic one (Japanese Patent Publication No. 21,346/69), (3) the combined use of divalent or trivalent water-soluble inorganic metal salt with a natural or synthetic petroleum sulfonate or a formaldehyde condensate thereof which forms a compound sparingly soluble in water with a divalent or trivalent metal ion (Japanese Patent Publication No. 6,549/70), or (4) a dispersion of an emulsifiable polymeric substance comprising a polyvinyl acetate, vinyl acetate copolymer, partially saponified product of these polymers, or polyacrylate ester (Japanese Patent Publication No. 6,551/70). Among these proposed methods, the method which employs a nozzle to disperse a polymer into fine particles has a difficulty to apply in the case of steam-stripping of resin because of the tendency of the formation of large resin blocks, though the method might be applicable to a rubbery substance. On the other hand, the method which makes use of a proposed dispersing agent was entirely unsuitable as a method to obtain a colorless transparent resin which meets the object of this invention, because it is known that any of the proposed dispersing agents resulted in either strong discoloration or much impaired transparency of the resin.

The present inventors had been deeply engaged in the investigation on the industrially reliable process for producing a transparent resin having excellent mechanical properties by block-copolymerizing in a hydrocarbon solvent a styrene-type monomer and a conjugated diene used as starting materials using an organolithium compound as an initiator, particular attention having been paid to the process for the recovery of the block copolymer resin from its solution and the dispersing agent for use in the recovery process. As a result, it was found that the object is achieved only in the case of a specific dispersing agent is used in the process of steam-stripping. Based on this finding, we have accomplished this invention.

An object of this invention is to provide a novel method to treat a polymer solution to obtain a colorless and transparent granular resin having excellent mechanical properties, in which said polymer solution is produced by block-copolymerizing a styrene-type monomer and a conjugated diene in a hydrocarbon solvent using an organolithium compound as an initiator.

Other objects and advantages of this invention will become apparent from the following description.

According to this invention, a transparent block copolymer resin is produced by copolymerizing 90 to 65 parts by weight of a styrene-type monomer and 10 to 35 parts by weight of a conjugated diene in a hydrocarbon solvent using an organolithium compound as an initiator to form a hydrocarbon solution of a block copolymer which is then stripped off the solvent by dispersing said hydrocarbon solution in hot water in the presence of a block-type polyether compound represented by the following general formula

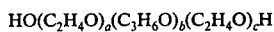

(where $a$, $b$, and $c$ each represents a number from 10 to 1,000) or the general formula

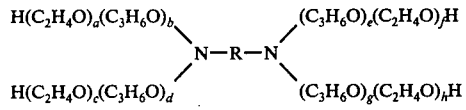

(where $a$, $b$, $c$, $d$, $e$, $f$, $g$, and $h$ each represents a number from 5 to 1,000 and R represents a hydrocarbon radical having 1 to 10 carbon atoms).

The method of this invention is described below in detail.

The styrene-type monomers to be used in the method of this invention include styrene, α-methylstyrene, vinylnaphthalene, vinyltoluene, and mixtures of these compounds. The conjugated dienes to be used include butadiene, isoprene, 2,3-dimethylbutadiene, piperylene, and mixtures of these compounds. Of the styrene-type monomers and the conjugated dienes, particularly preferred are styrene and butadiene, respectively, in view of their availability and usefulness. The charging ratio of the styrene-type monomer to the conjugated diene is preferably 90 to 65 parts by weight of the former to 10 to 35 parts by weight of the latter, considering the physical properties of the resulting copolymer resin, particularly tensile strength, elongation, impact strength, and softening point.

The inert hydrocarbon solvents to be used in the method of this invention include aromatic hydrocarbons such as benzene, toluene, and xylene, naphthenic hydrocarbons such as cyclopentane, cyclohexane, and methylcyclohexane, paraffinic hydrocarbons such as hexane and heptane, and mixtures of hydrocarbons. Any of these hydrocarbons can be used without any particular restriction so long as it dissolves, the obtained block copolymer resin under the polymerization conditions. The amount of such a hydrocarbon solvent to be used is generally 1 to 20 parts per part of the total weight of monomers.

The organolithium compound to be used in the method of this invention is that usually known as the monofunctional or bifunctional anionic polymerization initiator. Examples of individual lithium compounds include ethyllithium, propyllithium, butyllithium, amyllithium, trimethylenedilithium, tetramethylenedilithium, hexyllithium, cyclohexyllithium, phenyllithium, tolyllithium, naphthyllithium, and in addition, a lithium complex of an aromatic ring, and oligobutadienyldilithium or oligoisoprenyldilithium in the living state. The molecular weight of a block copolymer which is formed is regulated by the amount of an organoaluminum compound used. The amount of these organolithium compound to be used is usually 0.005 to 1.5 mole-% based on total monomers. It is desirable for the physical properties of a copolymer which is formed that the average molecular weight be in the range from 0.5 to 1.8 dl/g in terms of intrinsic viscosity ([$\eta$]), as measured in toluene at 30° C. In the polymerization step, it is also tolerable to use jointly with the initiator a compound known as anionic polymerization accelerator, such as tetrahydrofuran, tetramethylethylenediamine, and hexamethylphosphoramide. The use of a proper amount, preferably 0.05 to 2 mole-% based on total monomers, of an accelerator brings desirable results to the polymerization and the quality of a polymer which is formed.

The dispersing agent to be used in the method of this invention is a block-type polyether compound which is one of the compounds generally known as nonionic surface active agents and is represented by the general formula

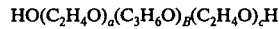

(where $a$, $b$, and $c$ each represents a number from 10 to 1,000) or the general formula

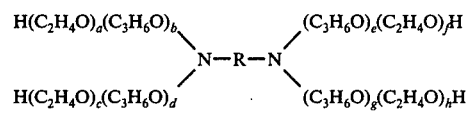

(where $a$, $b$, $c$, $d$, $e$, $f$, $g$, and $h$ each represents a number from 5 to 1,000, and R represents a hydrocarbon radical having 1 to 10 carbon atoms). There are known these types of compounds having various molecular structures in accordance with the molecular weight of polypropylene glycol portion [in the formula, represented by "$(C_3H_6O)$"] and the content of polyethylene glycol portion [in the formula, represented by "$(C_2H_4O)$"] in the molecular formula. Though any of such compounds can be used, it is preferable in the present method to use a polyether compound having a molecular weight of the polypropylene glycol portion of 1,000 to 5,000 and a content of the polyethylene glycol portion of 30 to 95% by weight, in view of dispersing ability of the compound, instability of the process, and transparency of the polymer that is obtained. By the same reasons, it is also preferable to use the dispersing agent in an amount of 0.05 to 5% by weight based on the weight of the polymer, though it may be used in a broader range if preferable. The dispersing agent specified above can be used in the condition of coexistence of other type dispersing agents in the process of this invention.

As mentioned before, the resin to be treated in the method of this invention is manufactured by blockcopolymerizing 90 to 65 parts by weight of a styrene-type monomer and 10 to 35 parts by weight of a conjugated diene in a hydrocarbon solvent using an organolithium compound as an initiator. If the homo-polymerization block of a styrene-type monomer is denoted by S, the homopolymerization block of a conjugated diene by B, and the copolymerization block by S/B, structures of the block copolymer may be represented, for example, by the following schemes:

1. S—B
2. S—B—S
3. S—B—S—B—S
4. S—S/B
5. S—S/B—S
6. S/B—S—S/B
7. S—S/B—B—S
8. S—S/B—S—S/B—S

The block copolymers having branched structure, which is synthesized by addition of a coupling agent (C) before termination of the polymerization, may be represented, for example, by the following schemes:

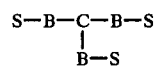   9)

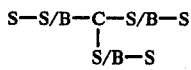

Among these copolymers, a polymer of the structure in which the main chain lacks in homopolymerization section of a styrene-type monomer (S) is undesirable because of defects in tensile strength and hardness as a resin. In manufacturing these block copolymers, any polymerization method may be employed so long as the above-mentioned types of polymer structure are secured. For instance, a block copolymer having the above-noted structure (4), S—S/B type, may be obtained by homopolymerizing in a hydrocarbon solvent in the presence of an accelerator such as tetrahydrofuran a styrene-type monomer in the first stage with an organolithium compound as an initiator, and then in the second stage adding simultaneously the styrene-type monomer and a conjugated diene to continue the copolymerization reaction. A block copolymer having the structure (5), S—S/B—S type, is obtained in a manner similar to that mentioned above by adding a styrene-type monomer in the first stage, then adding simultaneously the styrene-type monomer and a conjugated diene in the second stage, and again adding the styrene-type monomer in the third stage; or, alternatively, by adding simultaneously a styrene-type monomer and a conjugated diene using an organodithium compound as an initiator in the first stage and then adding the styrene-type monomer in the second stage.

It is possible to polymerize the monomers charged in the polymerization step with a conversion of substantially 100%. Although such a procedure is desirable because recovery of the monomers becomes unnecessary, the presence of some unreacted monomer is not harmful to the present method. The polymerization procedure is generally carried out batchwise or continuously in a reactor equipped with a jacket and a stirrer. The polymerization temperature is ordinarily $-20°$ C. to $150°$ C. The polymerization time is generally within 24 hours, usually 1 to 20 hours, being selected properly depending on polymerization conditions. After polymerization, if necessary, the polymer solution is subjected to the treatment such as termination of the polymerization, washing, or removal of the ash, and then sent to the recovery step.

In the polymer recovery step according to this invention, the polymer solution is mixed with hot water, while being stirred, in the presence of a block-type polyether compound represented by the aforementioned general formula to strip off the solvent and recover the polymer in the form of particles. As mentioned before, the amount of the block-type polyether dispersing agent to be used is usually 0.05 to 5% by weight based on the polymer. The block-type polyether dispersing agent is fed usually as a solution in hot water to the stripping tank. The hot water solution and the polymer solution can be either mixed in the stripping tank or premixed to form a dispersion before entering the stripping tank. In the stripping tank, while being stirred, the hot water containing the dispersing agent and the polymer solution are heated to strip off the solvent by introducing steam to the tank or indirectly heating through a jacket. The temperature in the tank should be above the azeotropic point of the solvent and water; for example, a temperature of $85°$ C. or higher is suitable for toluene and $70°$ C. or higher for cyclohexane. The time interval for stripping is selected so that it is sufficient for the solvent to be removed almost completely by distillation. The stirring condition should be intensive because it affects the state of dispersion as well as particle size, form, and bulk density of the polymer particles to be obtained. This stripping operation can be carried out either batchwise or continuously. By the stripping procedure, the polymer becomes fine granules suspended in water and ready to be collected by ordinary filtration and the like. To be especially noted is the fact that the polymer particles obtained by the method of this invention have the advantages of uniform particle size and high bulk density that are favorable for handling in a factory, and, moreover, the advantage of having no adverse effect on color and transparency of the fabricated articles. The stripped vapor of solvent and water from the stripping tank are cooled and condensed in an ordinary way. After having been separated from the water layer and, if necessary, purified, the solvent is recycled to the polymerization step to be re-used. The hot water from the stripping step, after having been separated from the polymer particles, can be, if necessary, recycled to the stripping tank to be re-used. The polymer particles from the stripping step, if necessary, can be further subjected to other treatments such as washing. The polymer in the form of fine granules recovered by the method of this invention is dehydrated and dried in a customary way. The dried polymer, if necessary, is admixed with a stabilizer and other additives and used either as such granular forms or after having been pelletized with an extruder in fabricating various articles which are colorless, transparent, and attractive in appearance. The application field of the polymer covers a broad range including various molded articles, sheetings, and films.

As stated in the foregoing, this invention provides a method for recovering a block copolymer resin in the form of fine granules having a uniform particle size and a high bulk density from its solution in a hydrocarbon solvent obtained by block-copolymerizing 90 to 65 parts by weight of a styrene-type monomer and 10 to 35 parts by weight of a conjugated diene in a hydrocarbon solvent using an organolithium compound as an initiator, which method comprises mixing said block-type copolymer solution with hot water in the presence of a block-type polyether dispersing agent represented by the aforesaid general formula and stripping off the solvent.

The resin thus obtained is excellent in transparency and also in mechanical properties and may be used widely as a general-purpose resin.

Embodiments of the invention are illustrated below by way of Examples, but this invention shall not be limited by the Examples as long as the gist of the invention is not exceeded.

EXAMPLE 1

The block copolymer resin to be used in the present Example was prepared in the following procedure.

Into a 25-liter stainless-steel autoclave, after having been thoroughly flushed with nitrogen to replace the air, were charged 15 liters of dried cyclohexane, 9.0 g of tetrahydrofuran, 75 millimoles of n-butyllithium, and 1.25 kg of styrene. The temperature in the autoclave was elevated to $60°$ C. and polymerization was allowed to proceed for 1.5 hours. Thereafter, a mixture of 1.25 kg of styrene and 1.25 kg of butadiene was added and polymerization was continued for additional 3.0 hours. Then again 1.25 kg of styrene was added and polymerization was continued for further 1.5 hours, the polymerization time having been 6 hours in total. After having been admixed with 50 ml of methanol to terminate polymerization and 2.5 g of octadecyl-3-(3′,5′-di-tert-butyl-4′-hydroxyphenyl) propionate (Irganox ® 1076, produced by Geigy Co.) as antioxidant, the polymer solution thus obtained was used in the stripping experiment. On analysis, it was found that the yield of the copolymer was 99.9%, the butadiene content of the copolymer 25%, and the intrinsic viscosity 0.74 dl/g, as measured in toluene at 30° C.

The steam-stripping according to this invention was carried out by the following way.

In 6 liters of purified water at 60° C., placed in a 30-l enameled vessel, was dissolved 6.0 g of a block-type polyether dispersing agent (Pluronic F68 produced by Asahi Denka Co.; average molecular weight 8,350; polyethylene glycol content 80% by weight). To the resulting solution was added with stirring 6 liters of the polymer solution obtained above. Then, steam was introduced gradually into the stirred vessel to elevate the temperature gradually to 90° C. over a period of 2 hours. During this treatment, the cyclohexane solvent had been stripped off and the resin was transformed into uniform granules, about 0.5 mm in diameter. The granular polymer thus formed was collected by filtration, washed with water, and dried to yield a white granular polymer having a bulk density of 0.45 g/ml. The polymer thus obtained was pelletized by means of an extruder and pressed at 190° C. to form a colorless and highly transparent sheet. The results of test for luminous transmittance and haze value according to the method of ASTM D 1003 were as shown in Table 1. A portion of the pellets was injection molded to form a specimen for the test of mechanical properties. The results of test on tensile strength and impact strength conducted on the injection molded specimen according to the method of JIS K 6871 were included also in Table 1.

Table 1

| Item of test | Testing method | Unit | Value | Preparative method for specimen |
| --- | --- | --- | --- | --- |
| Luminous transmittance | ASTM D1003 | % | 93.0 | Press |
| Haze value | ASTM D1003 | % | 6.0 | Press |
| Tensile strength | JIS K6871 | kg/cm² | 245 | Injection |
| Elongation | JIS K6871 | % | 290 | Injection |
| Izod impact strength* | JIS K6871 | kg . cm/cm² | 45.5 | Injection |

*Tested on a specimen without notch.

EXAMPLE 2

The same polymer solution as used in Example 1 was treated in the same manner as in Example 1, except that the same amount of another block-type polyether dispersing agent (Pluronic F88 produced by Asahi Denka Co.; average molecular weight 10,800; polyethylene glycol content 80% by weight) was used.

The polymer separated out in the form of uniform and fine white granules forming a satisfactory suspension. The fine granular polymer was dried, pelletized, and pressed to form a colorless, transparent, and beautiful sheet.

EXAMPLE 3

A polymer solution prepared in the same manner as in Example 1 was treated in the same manner as in Example 1, except that 6.0 g of a different block-type polyether dispersing agent (Pluronic L64 produced by Asahi Denka Co.; average molecular weight 2,900; polyethylene glycol content 40% by weight) and 4.0 g of sodium dodecylbenzenesulfonate were used. A uniform white polymer in powder form was obtained. The polymer was dried, pelletized, and pressed to form a colorless, transparent and beautiful sheet.

COMPARATIVE EXAMPLE 1

A polymer solution prepared in the same manner as in Example 1 was used in a stripping experiment conducted in the same manner as in Example 1, except that the compound shown in Table 2 was used as the dispersing agent. The results obtained were as shown in Table 2. As is apparent from Table 2, when a dispersing agent other than the block-type polyether compound was used, the polymer congealed to form a block and the polymer in dispersion form was not obtained.

Table 2

| Experiment No. | Dispersing agent | Amount used (PHR*) | After stripping |
| --- | --- | --- | --- |
| 1 | Polypropylene glycol (average molecular weight 2,000) | 1.0 | Congealed |
| 2 | Polyethylene glycol (average molecular weight 1,000) | 2.0 | Congealed |

*PHR is abbreviation of parts per hundred resin.

EXAMPLE 4

Six liters of a cyclohexane solution of a block copolymer resin (intrinsic viscosity 0.74 dl/g; butadiene content 25%) prepared in the same manner as in Example 1 was used in a stripping experiment conducted in the same manner as in Example 1, except that 6.0 g of a different dispersing agent (Tetronic 707 produced by Asahi Denka Co.; average molecular weight 12,000; polyethylene glycol content 70% by weight) was used.

The granular polymer separated out was collected by filtration, washed with water, and dried to obtain a polymer in the form of free-flowing white granules having a bulk density of 0.45 g/ml. The polymer was pelletized by means of an extruder and pressed at 190° C. to form a sheet which was colorless and highly transparent. The luminous transmittance and haze value were determined according to the method of ASTM D1003 and the results obtained were as shown in Table 3. A portion of the pellets was injection molded to form a specimen. The specimen was tested for the tensile strength and impact strength according to the method of JIS K6871. The results obtained were included also in Table 3.

Table 3

| Item of test | Testing method | Unit | Value | Preparative method for specimen |
| --- | --- | --- | --- | --- |
| Luminous transmittance | ASTM D1003 | % | 92.0 | Press |
| Haze value | ASTM D1003 | % | 7.0 | Press |
| Tensile strength | JIS K6871 | kg/cm² | 238 | Injection |
| Elongation | JIS K6871 | % | 285 | Injection |

Table 3-continued

| Item of test | Testing method | Unit | Value | Preparative method for specimen |
|---|---|---|---|---|
| Izod impact strength* | JIS K6871 | kg . cm/cm² | 55 | Injection |

*Tested on a specimen without notch.

EXAMPLE 5

The same polymer solution as used in Example 4 was treated in the same manner as in Example 4, except that the same amount of another block-type polyether dispersing agent (Tetronic 908 produced by Asahi Denka Co.; average molecular weight 22,500; polyethylene glycol content 80% by weight) was used.

The polymer was obtained in the form of uniform, white, fine granules forming a satisfactory suspension. The fine granular polymer was dried, pelletized, and pressed to form a colorless, transparent, and beautiful sheet.

EXAMPLE 6

The polymer solution prepared in the same manner as in Example 4 was treated in the same manner as in Example 4, except that 6.0 g of another block-type polyether dispersing agent (Tetronic 1107 produced by Asahi Denka Co.; average molecular weight 14,500; polyethylene glycol content 70% by weight) and 4.0 g of sodium dodecylbenzenesulfonate was used. The polymer was separated out in the form of uniform, and white powder. The polymer was dried, pelletized, and pressed to form a colorless, transparent, and beautiful sheet.

What is claimed is:

1. In a process for recovering a granular block copolymer from its hydrocarbon solution obtained by block copolymerizing in a hydrocarbon solvent 90 to 65 parts by weight of a styrene-type monomer and 10 to 35 parts by weight of a conjugated diene using an organolithium compound as an initiator, the improvement whereby a transparent block copolymer resin is produced, which comprises dispersing said block copolymer solution in heated water in the presence of a block-type polyether compound represented by the formula

where $a$, $b$, and $c$ each represent a number from 10 to 1,000 or the formula

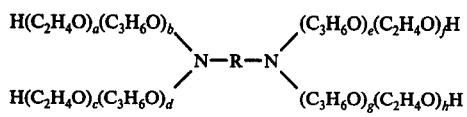

where $a$, $b$, $c$, $d$, $e$, $f$, $g$, and $h$ each represent a number from 5 to 1,000, R represents a hydrocarbon radical having 1 to 10 carbon atoms, the content of the ($C_2H_4O$) portion of said block-type polyether compounds being 30 to 95% by weight and the molecular weight of the polypropylene glycol portion being 1,000 to 5,000 to strip off the solvent from said solution by means of steam stripping and then recovering the block copolymer granules from water by filtration.

2. A process according to claim 1, wherein the block-type polyether compound is used in an amount of 0.05 to 5% by weight based on the polymer.

3. A process according to claim 1, wherein the styrene-type monomer is at least one member selected from the group consisting of styrene, α-methylstyrene, vinylnaphthalene, and vinyltoluene.

4. A process according to claim 1, wherein the conjugated diene is at least one member selected from the group consisting of butadiene, isoprene, 2,3-dimethylbutadiene, and piperylene.

5. A process according to claim 1, wherein the hydrocarbon solvent is at least one member selected from the group consisting of benzene, toluene, xylene, cyclopentane, cyclohexane, methylcyclohexane, hexane, and heptane.

6. A process according to claim 1, wherein the stripping of solvent is carried out batchwise or continuously by use of a stirred tank.

7. A process according to claim 7, wherein the block copolymer solution and the heated water are premixed and then fed to the stirred tank.

8. A process according to claim 7, wherein the heated water, block-type polyether compound, and block copolymer solution are mixed in the stirred tank and live steam is introduced into said tank to elevate the temperature.

9. A process according to claim 7, wherein the stripping temperature is equal to or higher than the azeotropic point of the solvent and water.

* * * * *